US006697838B1

(12) United States Patent
Jakobson

(10) Patent No.: US 6,697,838 B1
(45) Date of Patent: Feb. 24, 2004

(54) METHOD AND SYSTEM FOR ANNOTATING INFORMATION RESOURCES IN CONNECTION WITH BROWSING, IN BOTH CONNECTED AND DISCONNECTED STATES

(75) Inventor: Gabriel Jakobson, Las Vegas, NV (US)

(73) Assignee: SoftWare Leader, LLC, Las Vegas, NV (US)

( * ) Notice: Subject to any disclaimer, the term of this patent is extended or adjusted under 35 U.S.C. 154(b) by 0 days.

(21) Appl. No.: 09/564,076

(22) Filed: May 3, 2000

(51) Int. Cl.[7] .......................... G06F 17/00; G06F 15/00
(52) U.S. Cl. ........................................ 709/203; 715/512
(58) Field of Search .......................... 707/501; 709/203, 709/706, 223, 245

(56) References Cited

U.S. PATENT DOCUMENTS

| 6,081,829 | A  | * | 6/2000 | Sidana ........................ 709/203 |
| 6,266,681 | B1 | * | 7/2001 | Guthrie ....................... 707/501 |
| 6,289,362 | B1 | * | 9/2001 | Van Der Meer ............ 707/501 |
| 6,551,357 | B1 | * | 4/2003 | Madduri ...................... 715/512 |
| 6,584,479 | B2 | * | 6/2003 | Chang et al. ............... 715/512 |

OTHER PUBLICATIONS

Gupta et al., Facilitating Annotation Creation and Notification via Electronic Mail, Nov. 15, 2001, U.S. patent application Publication, US 2001/0042098 A1.*

Print-out of help file accompanying POPNOTES software by Brighton Beach Software, Australia, 1997.
Print-out of Web page from www.nextword.com web site describing 1stSource software, 1998.
Print-out of help file accompanying Winsqueeze software available from www.winsqueeze.com, 2000.
Print-out of Web page from www.3m.com web site describing 3M Corp. PostIt (R) Software Notes, 1999.
Print-out of Web page from www.thirdvoice.com Web site describing ThirdVoice Software, 2000.
Print-out of Web page from www.kaylon.com Web site describing PowerMarks TM Software, 1997.

* cited by examiner

Primary Examiner—Zarni Maung
Assistant Examiner—Dustin Nguyen

(57) ABSTRACT

A method and system for creating and using notes while browsing information resources (e.g., Web pages) available on a data network (e.g., the Internet) with a client device (e.g., a personal computer, a personal digital assistant, a cellular telephone, and the like) are disclosed. In accordance with the disclosed method and system, when the client device is used to access an information resource, a user of the client device may enter data comprising a note associated with the information resource being accessed. The note is stored in a file for later retrieval. As the user accesses various information resources, they may create separate notes associated with each information resource accessed. When the user subsequently returns to an information resource associated with a previously created and stored note, such note may be automatically displayed to the user.

19 Claims, 15 Drawing Sheets

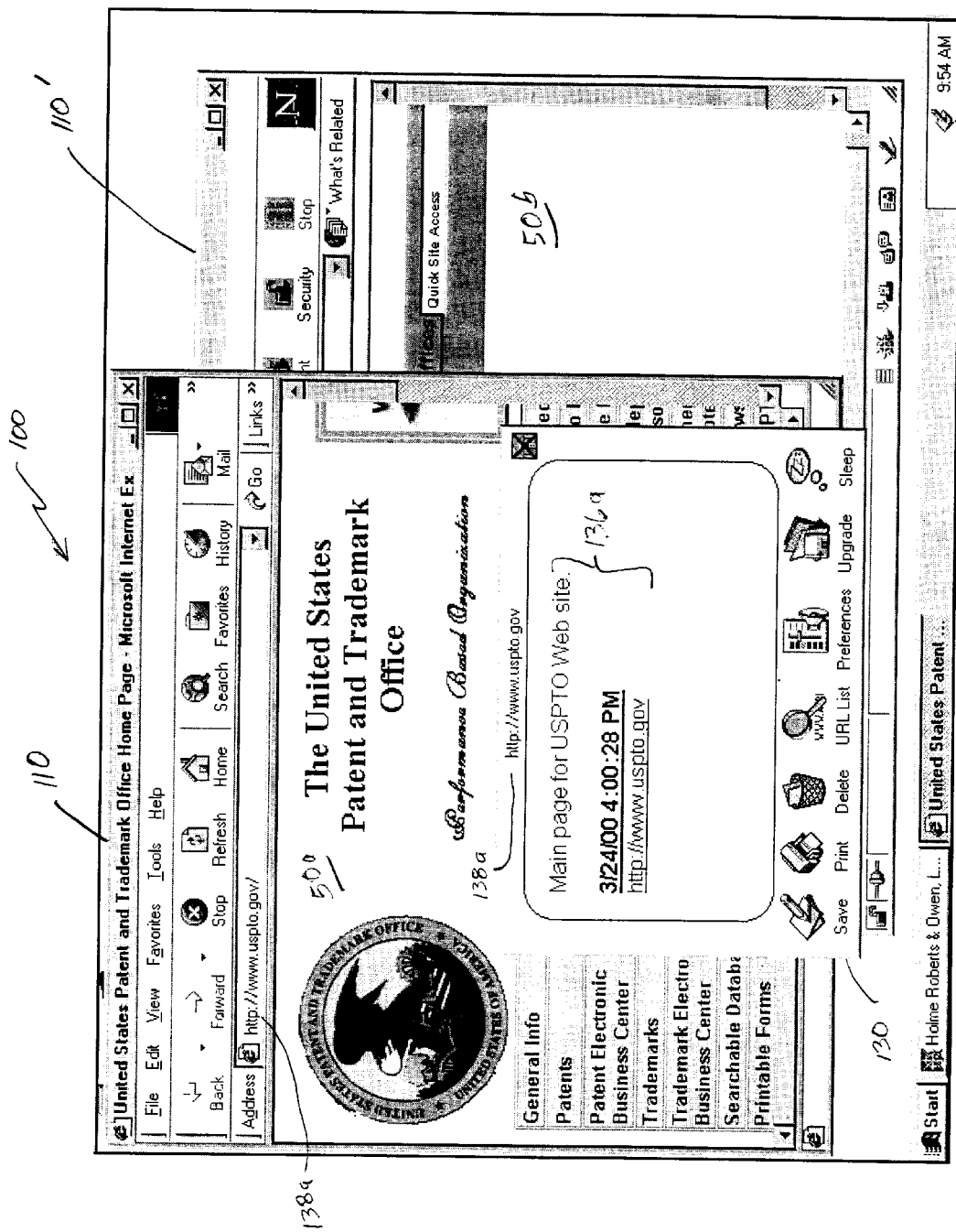

90

92 { http://www.uspto.gov — 138a
    httpwwwusptogov.rtf — 80a
94 —"/ Ü#

92 { http://www.uspto.gov/web/menu/search.htm — 138b
    httpwwwusptogovwebmenusearchhtm.rtf — 80b
94 —Ï☐ Y☐ Ÿ☐ ☐☐

92 { http://www.uspto.gov/patft/index.htm — 138c
    httpwwwusptogovpatftindexhtm.rtf — 80c
94 —ò☐ ☐☐ Y☐ ☐☐

92 { http://www.hro.com/main.cf — 138d
    httpwwwhrocommaincf.rtf — 80d
94 —E☐ Ï☐ a& L☐

METHOD AND SYSTEM FOR ANNOTATING INFORMATION RESOURCES IN CONNECTION WITH BROWSING, IN BOTH CONNECTED AND DISCONNECTED STATES

FIELD OF THE INVENTION

The present invention generally relates to the browsing of information resources accessible through a data network, including Web pages and the like, and, more particularly to a system and method for use in creating and utilizing electronic notes relating to information resources while browsing the information resources.

BACKGROUND OF THE INVENTION

Data networks permit one device (e.g., a client) connected to the network to access an information resource available on another device (e.g., a server) also connected to the network. One example of such a network is the Internet. Using standard Internet protocols, such as the hypertext transport protocol ("HTTP"), client devices connected to the Internet may access many information resources including information resources that are part of the World Wide Web (the "Web"). The Web is a collection of numerous Web sites stored on servers connected to the Internet. Each Web site on the Web may be comprised of multiple Web pages including, for example, hypertext documents and related image, audio and video files, electronic forms, software applications and the like. The locations of Web pages available on servers connected to the Internet are identified by string expressions known as uniform resource locators (URLs), sometimes also referred to as universal resource locators. URLs typically follow the format: protocol to be used when accessing the resource://name of host on which the resource is located/directory on host/name of resource. For example, the URL 'http://www.hro.com/main.cfm' identifies the resource named 'main.cfm' on the Web host 'hro.com' and specifies that the HTTP be used in accessing the named resource.

Web browsers, such as those available from Microsoft®, Netscape® and American Online®, permit users to easily access and view Web pages identified by their associated URLs. Given the often hyperlinked nature of Web pages, a person browsing the Web ("a Web surfer") with a Web browser may easily go from one Web page to another, and, in a relatively short period of time, a Web surfer may visit numerous Web pages. As may be appreciated, it can be difficult for a Web surfer to remember what Web pages they have previously accessed, not to mention their identifying URLs. Likewise, it can be quite difficult for a Web surfer to recall information they may have obtained from a Web page that they have visited.

In addition to visiting numerous Web pages in a relatively short period of time, a Web surfer may periodically re-visit the same Web pages. Since the content of a particular Web page may change over time, it can be difficult for a Web surfer to recall information that was present on a particular Web page when they previously visited that page. For example, a Web surfer may periodically visit a Web page that provides current stock price quotations, and since the stock price quotations can change quickly, it can be quite difficult for a Web surfer to recall the price quoted for a particular stock several days prior.

One manner in which a Web surfer may remember what Web pages they have visited is to maintain a separate list (e.g., hand-written or prepared using a word processor program) of Web pages and their associated URLs. They may then refer to their list and manually enter the URL of a Web page that they want to visit into their Web browser command line. Additional notes may be added to the separately maintained list by the Web surfer in order to remember information obtained from the various Web pages. However, maintaining and utilizing such a list can be difficult since doing so does not seamlessly correlate the notes with their corresponding Web pages during the Web browsing process.

As an alternative to paper notes, many Web browsers include a feature whereby a user of the browser may save a list of Web pages that the user may wish to access again in the future (e.g., a "favorites" or "bookmarks" feature). The Web surfer may then simply select a desired Web page from the list in order to prompt the Web browser to access the selected Web page again. However, such Web browser features typically do not permit a Web surfer to create and maintain extensive notes relating to a listed Web page.

Moreover, a user may wish to annotate web pages stored locally on his/her device and be presented with notes corresponding with each locally-stored web page while disconnected from any network or the internet.

SUMMARY OF THE INVENTION

Accordingly, the present invention is directed to a method and system for creating and using notes while browsing information resources (e.g., Web pages) accessible through a data network (e.g., the Internet) with a client device (e.g., a personal computer, a personal digital assistant, a cellular telephone, and the like). In accordance with the present invention, browsing activity using the client device is monitored. When the client device is used to access an information resource, the system and method of the present invention permit a user of the client device to enter data comprising a note associated with the information resource being accessed. The note is stored in a file for later retrieval. As the user accesses various information resources, they may create separate notes associated with each information resource accessed. When the user subsequently returns to an information resource associated with a previously created and stored note, such note may be automatically output to the user. Thus, the method and system of the present invention assist a user thereof in recognizing information resources that they have previously accessed and recalling information that they may have noted while previously accessing such information resources.

According to one aspect of the present invention, a method for use in connection with browsing of information resources accessible to a client device through a data network (e.g., Web pages accessible via the Internet) includes the step of determining whether there is a stored note file corresponding with an information resource accessed by the client device. In this regard, the stored note file corresponding with the accessed information resource may, for example, be stored on a data storage device of the client device or on a data storage device accessible to the client device via the data network. Based upon a determination made in the determining step that there is a stored note file corresponding with the accessed information resource, at least some data from the stored note file corresponding with the accessed information resource is output. In this regard, data from the stored note file corresponding with the accessed information resource may, for example, be output on a display screen accessible to the client device, on an audio speaker accessible to the client device, or on a printer accessible to the client device. The method may further include the step of receiving data inputable by a user of the client device for inclusion in a new note file corresponding to the accessed information resource. The receiving step is executed based on a determination made in the determining step that there is no stored note file corresponding with the accessed information resource.

According to another aspect of the present invention, a method of creating and using notes relating to Web pages using a client device enabled for browsing the Web includes the step of determining whether a previously created note file Corresponding with a Web page accessed by the client device is stored on the client device. When it is determined that there is a note file corresponding with the URL of the Web page pointed to by the browser, stored on the client device, at lease some data from the stored note file corresponding with the accessed Web page is then output on an output device of the client device. When it is determined that there is no note file corresponding with the URL of the Web page pointed to by the browser, stored on the client device, data imputable by a user of the client device for including in a new note file corresponding to the accessed Web page is received. The new note file may then be assigned a name, and the new note file may be stored on the client device using the assigned name. In this regard, the name assigned the new note file may comprise a text string that includes at least some characters parsed from a uniform resource locator of the accessed Web page. The new note file may be assigned a name and stored on the client device upon receiving an input indicating that the new note file is to be stored, or when another Web page is accessed by the client device.

In determining whether a previously created note file corresponding with the accessed Web page is stored on the client device, a database including data cross-referencing names of stored note files with uniform resource locators identifying Web pages to which the stored note files correspond may be accessed. A uniform resource locator identifying the accessed Web page may be compared with the uniform resource locators in the database to determine whether a previously created note file at corresponding to the accessed Web page is stored on the client device. In this regard, the database may comprise an ASCII text file having entries comprising the name of a stored note file paired with the uniform resource locator identifying the Web page with which the stored note file corresponds. When a new note file is stored, the database may also be updated to include data cross-referencing the uniform resource locator identifying the accessed Web page with the assigned name of the new note file.

According to yet another aspect of the present invention, a system for creating and using electronic annotations relating to information resources includes a processor enabled for accessing information resources (e.g., Web pages) through a data network (e.g., the Internet), a storage device, an output device, and an input device, all accessible by the processor, and an application program executable by the client device. The processor, storage device, output device, and input device may all be part of one client device, such as, for example, a personal computer system, a personal digital assistant, or a cellular telephone. The application program enables the processor to determine, when the processor is used to access an information resource, to whether a previously created note file corresponding with the accessed information resource is stored on the storage device. When it is determined that there is a note file corresponding with the accessed information resource on the storage device, the application program enables the processor to output at least some data from stored note files corresponding with the accessed information resource on the output device. When it is determined that there is no note file corresponding with the accessed information resource stored on the storage device, the application program enables the processor to receive data from the input device for inclusion in a new note file corresponding to the accessed information resource.

The system of the present invention may further include a database accessible to the processor. The database may be stored on the storage device. The database includes data cross-referencing names of stored note files with identifiers identifying the information resources to which the stored note files correspond. For example, where the information resources are Web pages, the identifiers may comprise uniform resource locators and the database may comprise an ASCII text file having entries comprising the name of a stored note file paired with the uniform resource locator identifying the Web page with which the stored note file corresponds. The application program may further enable the processor to determine whether a note file corresponding with the accessed information resource is stored on the client device by comparing a uniform resource locator identifying the accessed information resource with the identifiers in the database. Additionally, the application program may enable the processor to assign the new note file a name and store the new note file on the storage device using the assigned name. The application program may also enable the processor to update the database to include data cross-referencing the identifier identifying the accessed information resource with the assigned name of the new note file.

According to a further aspect of the present invention a method for use in browsing information resources using a client device includes the step of accessing an information resource. Once the URL of the information resource has been pointed to by the browser, data comprising a note file corresponding to the accessed URL may be received. The note file may then be stored on the client device for later retrieval. When it is determined that the URL pointed to by the browser corresponds to a stored note file, the stored note file is retrieved, and at least some data from the retrieved note file is output on an output device of the client device. In this regard, a browser program executable by the client device may be used to perform the steps of accessing, receiving, storing, retrieving and outputting. A timer utilizes application programming interface calls to monitor the URL currently pointed to by the browser in-focus, to determine the currently pointed to URL. Alternatively, a browser program executable by the client device may be used to perform the step of accessing, and a plug-in to the browser may be used to perform the steps of accessing, storing, retrieving and outputting. Further, the step of accessing may be performed using a browser program executable by the client device, and the steps of receiving, storing, retrieving and outputting may be performed using an application program separately executable from the browser program by the client device.

According to an additional aspect of the present invention a system for use in browsing information resources using a client device includes means for accessing an information resource. In this regard, the means for accessing may comprise a browser application program executable by the client device. The system further includes means for receiving data comprising a note file corresponding to the accessed information resource, means for storing the note file on the client device, means for retrieving the stored note file when the information resource is subsequently accessed, and means for outputting, on an output device of the client device, at least some data from the retrieved note file. In the regard, the means for receiving, means for storing, means for retrieving, and means for outputting may comprise a browser application program executable by the client device. Alternatively, the means for receiving, means for storing, means for retrieving, and means for outputting may comprise a plug-in program executable by the client device in conjunction with execution of the browser program. Further, the means for receiving, means for storing, means for retrieving, and means for outputting may comprise an application program executable by the client device separate from the browser program.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which:

FIGS. 2A–2K are exemplary screen displays further illustrating the operation of the Web site annotation system of the present invention;

FIG. 3 is a listing of an exemplary ASCII format text file database included in the Web site annotation system of the present invention; and FIGS. 4A–4B are exemplary screen displays illustrating additional operational features that may be included in the Web site annotation system of the present invention.

DETAILED DESCRIPTION

Figure 1:
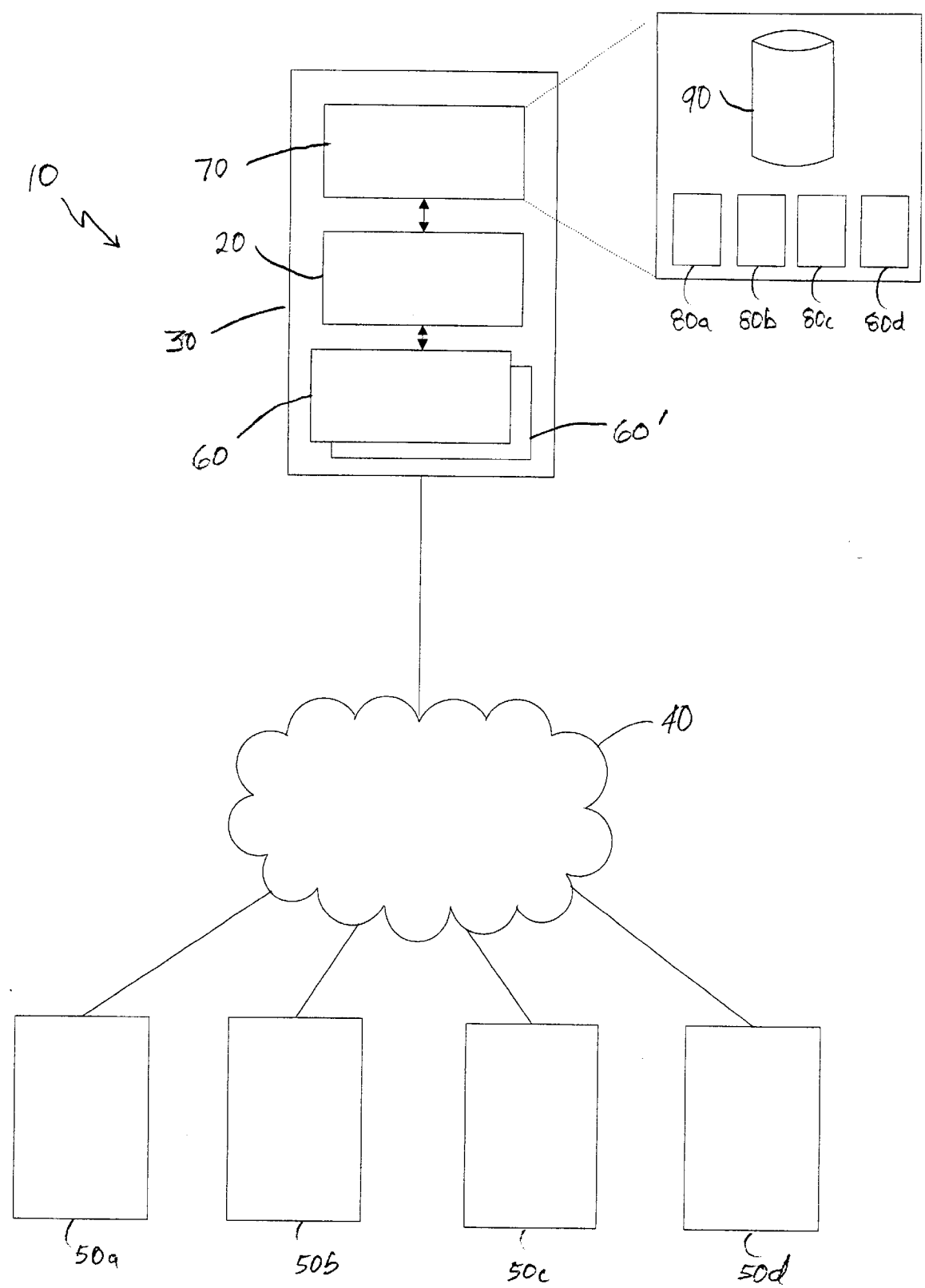
FIG. 1 is a block diagram of the general system architecture of one embodiment of a Web site annotation system in accordance with the present invention.

FIG. 1 illustrates a block diagram of the general system architecture of one embodiment of a Web site annotation system 10 in accordance with the present invention. The system 10 includes a client-side application program 20 that is installed on and executable by a client device 30 enabled for browsing via, for example, a data network 40 (e.g., the Internet) one or more Web pages 50a–d. In the embodiment illustrated herein, the client device 30 comprises a personal computer having a web browser application 60, for example, such as browsers available from Microsoft®, Netscape® and America Online® enabling the client device 30 to browse (i.e., access and display) the Web pages 50. It should be appreciated that the client device 30 may comprise any Internet enabled device such as, for example, a personal digital assistant (e.g., a Palm VII® organizer), or a cellular telephone. In the illustrated embodiment, the client device 30 also includes at least one data storage device 70 (e.g., flash memory, a floppy or hard disk, a recordable compact disc drive) for storing data.

The client-side application program 20 enables a user thereof to create, maintain and use electronic notes associated with the Web pages 50 while using the client device 30 to surf the Web. Data comprising the electronic notes is input by the user and is subsequently stored on the data storage device 70 of the client device 30 in separate note files 80a–d. An index database 90 maintained on the data storage device 70 includes data cross-referencing the name of each note file 80a–d with the URL of the Web page 50 with which it is associated. The client-side application program 20 interacts with the Web browser 60 to recognize when the browser 60 is being used to visit a Web page 50 having an associated note file 80a–d stored on the data storage device 70. The contents of the associated note file 80a–d, if any, are then automatically presented by the client-side application program 20 to the user.

Referring now to FIGS. 2A to 2K, there are shown exemplary screen displays 100 further illustrating the operation of the Web site annotation system 10 of the present invention. The exemplary screen displays 100 shown are for a personal computer client device 30 running Microsoft's Windows® operating system and having Microsoft's Internet Explorer Web browser 60. However, it should be appreciated that the screen displays 100 may appear quite differently with different client devices, operating systems and Web browsers.

Figure 2A:
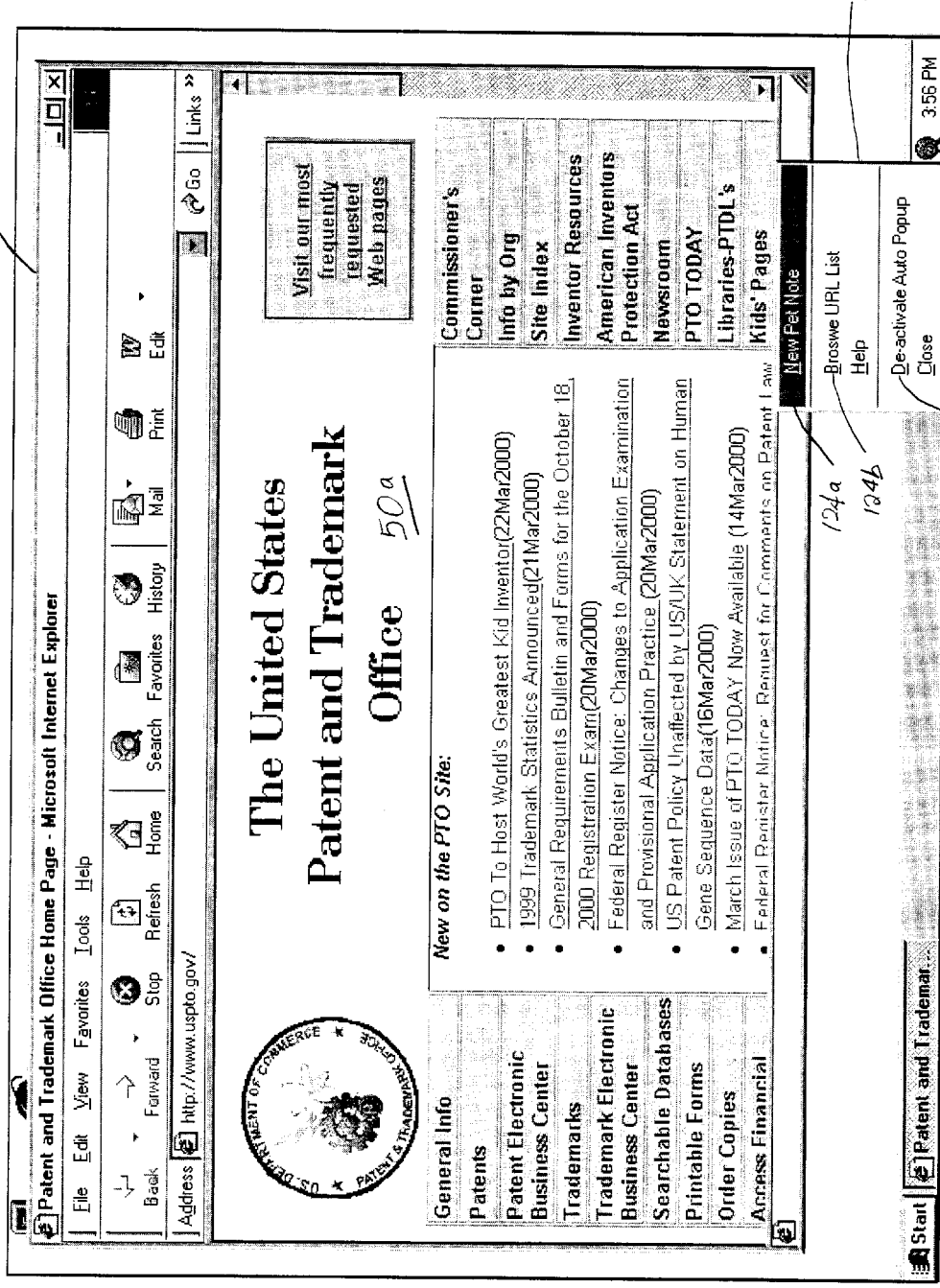

In FIG. 2A, the screen display 100 shown includes a window associated with the Web browser 60 (hereafter the Web browser window 110) open on the desktop. The Web browser window 110 is shown with the Web browser 60 being used to visit the Web page 50a having the URL "http://www.uspto.gov/" (the main Web page of the United States Patent and Trademark Office's Web site). It is assumed that a note file associated with this Web page 50a has not been previously created and stored. The client-side application program 20 of the Web site annotation system 10 is operating in the background as indicated by the graphic used for its associated icon 120 in the system tray. If the user wishes to create a note file 80a associated with the Web page 50a being visited, the user may use a pointing device (e.g., a mouse) to double-click on icon 120 or right-click on icon 120 and choose the new note command 124a from an associated pop-up menu 122.

Figure 2B:
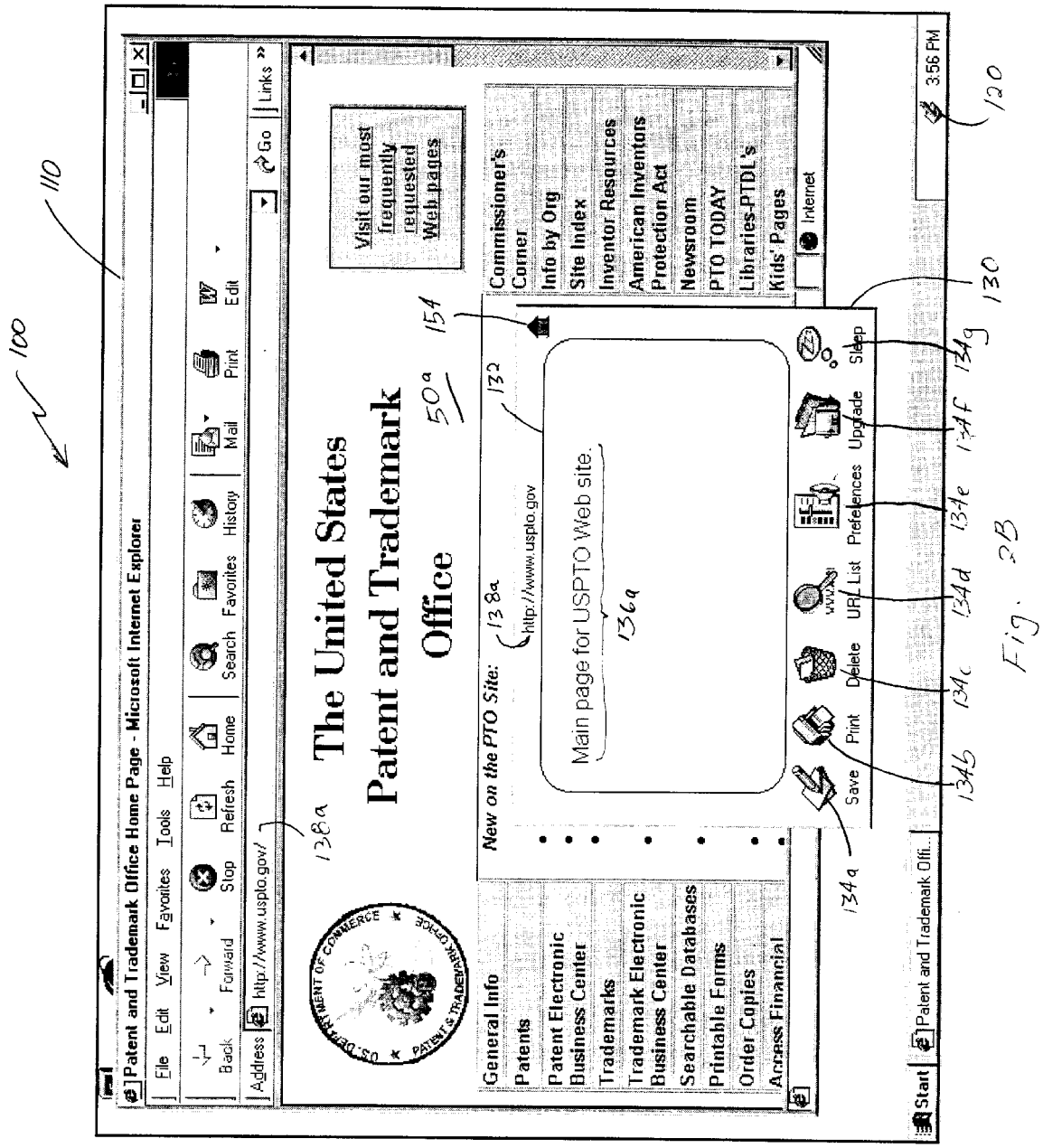

FIG. 2B shows the screen display 100 after the user has selected the new note command 124a from the pop-up menu 122 associated with icon 120. Another window associated with the client-side application program 20 (hereafter the application window 130) is opened over the top of the Web browser window 110. In this regard, the graphic used for application icon 120 in the system tray may be changed from that shown in FIG. 2A to a different graphic as shown in FIG. 2B to indicate that the client-side application program 20 is now operating in the foreground.

The application window 130 includes a note display area 132 and several command buttons 134a–h. The user may create a new note file 80a that is associated with the Web page 50a displayed in the Web browser window 110 by using data entry means (e.g., a keyboard, voice recognition software, hand-written character recognition software) of the client device 30 to enter data 136 for inclusion in the note file 80a. As it is being entered, the data 136 is displayed in the note display area 132 of the application window 130. The URL 138a of the Web page 50a with which the note file 80a is associated may be displayed near the top edge of the application window 130.

Each command button 134a–h of the application window 130 has a specific action associated with it that is undertaken when the button 134a–h is clicked. Clicking on the save button 134a causes the client-side application program 20 to save the note file 80a to the data storage device 70. When the note file 80a is saved, it is assigned a name by the client-side application 30 in accordance with a naming convention. In this regard, the note file 80a may be named using characters parsed from the URL 138a in order to provide the note file 80a with a unique name that is easily identified as being associated with Web page 50a. For example, note file 80a may be named "httpwwwusptogov.rtf" which is URL 138a with the punctuation characters removed and the extension ".rtf" added to indicate that the note file 80a is saved in a rich text format. In addition to saving the note file 80a when the save button 138a is clicked, the application program 20 may also automatically save the 30 note file 80a if the user navigates the Web browser 60 to a new Web page or clicks on the sleep button 134g.

When the note file 80a is saved, the index database 90 is also updated to include an entry having data cross-referencing note file 80a with the URL 138a of its associated Web page 50a. It should be appreciated that, if note file 80a is the first note file to be created, the index database 90 may be created (with the required entry) rather than updated when note file 80a is saved.

Clicking on the print button 134b, initiates printing of the data 136a in the note file 80a. The note file 80a may be deleted by clicking on the delete button 134c. If the note file 80a is deleted, the index database 90 is updated accordingly by the clientside application program 20. Clicking the URL list button 134d brings up a URL list window (further described in connection with FIG. 2K). Clicking on the preferences button 134e brings up a preferences window (not shown in FIG. 2B) wherein the user may set various preferences, including the color and font used in displaying the note data 136a in the note display area 132 of the application window 130, whether or not note files should be automatically saved when the user clicks on the sleep button 134g or navigates to a new Web page, and whether or not the application program 20 should be in the stick-to-home or un-stick to home mode (described more fully below in connection with FIG. 2C). Clicking on the upgrade button 134f may provide the user with information relating to upgrades for the client-side application program 20, if any. In this regard, clicking on the upgrade button 134f may cause the Web browser 60 to navigate to a Web site wherein further information regarding the client-side application program 20 and later versions thereof, if any, are available. Clicking on the sleep button 134g causes the application window 130 to be removed from the screen display 100. In this regard, the application icon 120 may be changed back to the icon 120 shown in FIG. 2A to indicate that the client-side application is again operating in the background (i.e., to indicate that the application program 20 is "sleeping").

Figure 2C:
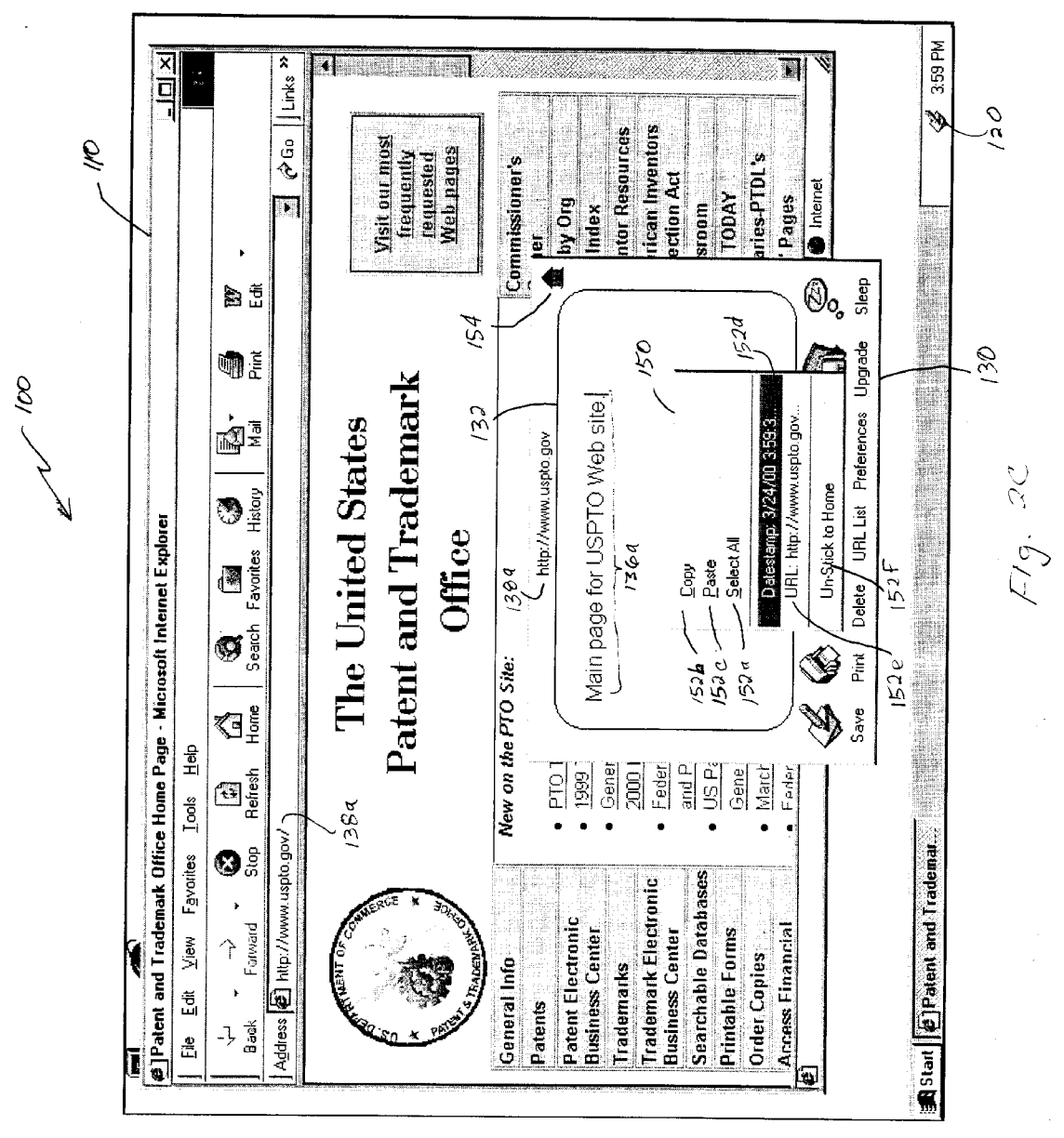

Referring now to FIG. 2C, a command window 150 may be displayed over the application window 130 by right clicking within the boundaries of the application window 130. The command window 150 includes several commands 152a–f in addition to the commands available via the command buttons 134a–g. The select all command 152a selects all of the note data 136a. The copy command 152b copies selected note data 136a to the clipboard of the client device 30. The paste command 152c adds the contents of the clipboard to the note data 136a at the current cursor position. The datestamp command 152d inserts the current date and time obtained from the client device 30 system clock into the note data 136a at the current cursor position. As may be appreciated, the datestamp command 152d makes it convenient for the user to add date and time information to the note data 136a for later reference. The URL command 152e inserts the URL 138a of the associated Web page 50a into the note data 136a at the current cursor position.

Figure 2D:
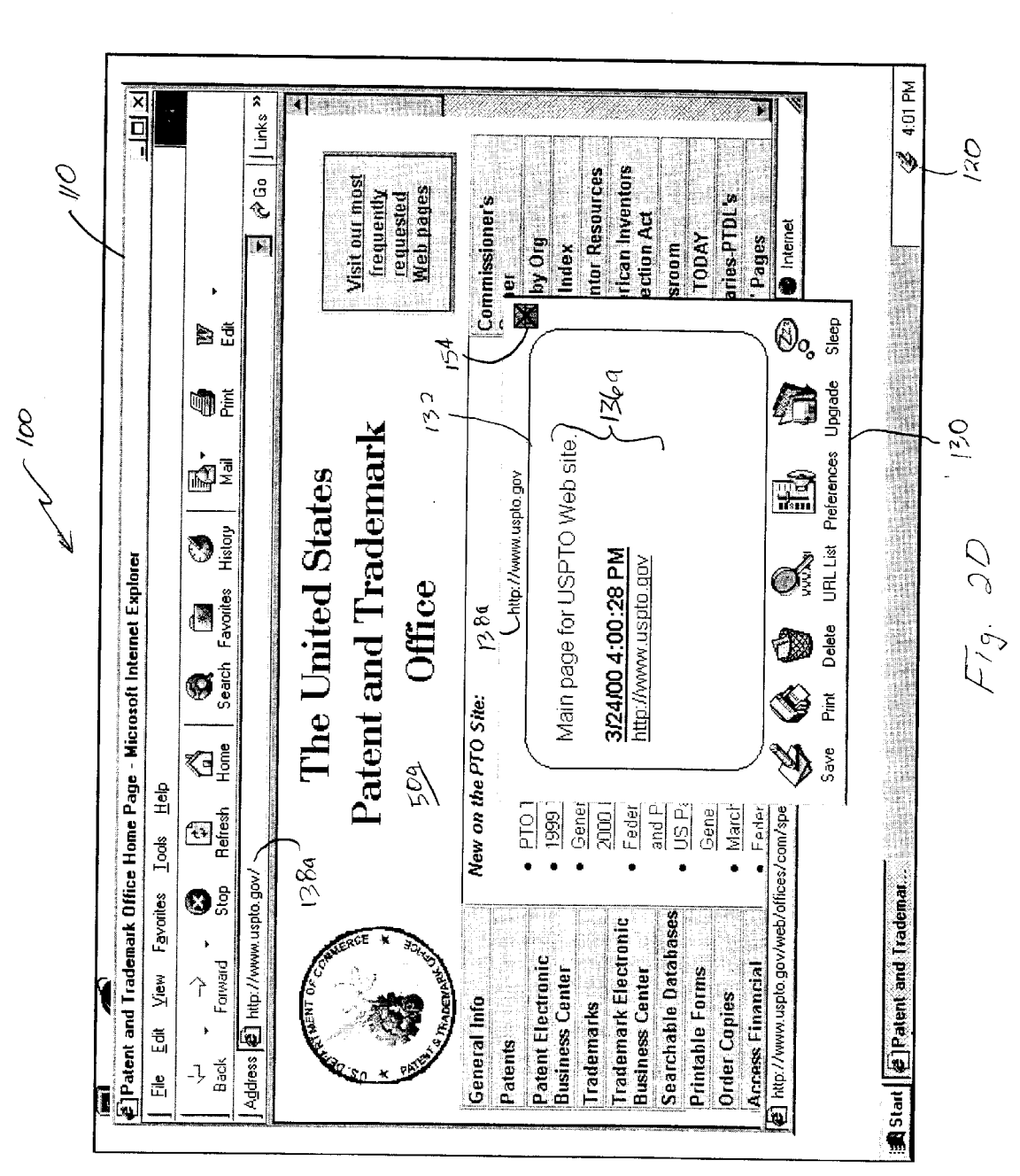

Since many Web sites include a home page and numerous sub-pages, the client-side application program 20 includes an un-stick/stick command 152f. The un-stick/stick command permits the user to toggle the client-side application program 20 between a stick-to-home mode wherein all note files created for a given Web site are associated with the URL of the home page of the Web site, regardless of whether they are created while visiting a sub-page of the Web site, and an un-stick-to-home mode wherein each note file created is associated with the URL of the specific Web page visited when the note files was created and stored. A first small icon 154 may be provided in the application window 130 to indicate whether the client-side application program 20 is in the stick-to-home mode or in the un-stick-to-home mode. For example, a house graphic, as shown in FIG. 2C, may be used as the first small icon 154 to indicate stick-to-home mode, and a house crossed with an "X" graphic, as shown in FIG. 2D, may alternatively be used as the first small icon 154 to indicate un-stick-to-home mode. Clicking on the first small icon 154 may also toggle the client-side application program 20 between the stick-to-home and un-stick-to-home modes. Further, the desired mode may also be selected in the preferences window displayed when the user clicks on the preferences button 134e.

FIG. 2D shows the application window 130 after the datestamp and URL commands 152d, 152e have been used to insert the date and time the note file 80a was created, and the URL of the associated Web page 50a into the note data 136a. The client-side application program 20 has also been toggled to the un-stick-to-home mode, as is indicated by the small icon 154, so that the note file will be associated with Web page 50b when saved.

Figure 2E:

FIG. 2E shows the screen display 100 after the sleep button 134g has been clicked to put the client-side application program 20 to sleep and thereby permit the complete Web page 50a to be viewed in the Web browser window 110. In this regard, the application icon 120 is changed to indicate the sleeping status of the client-side application program 20.

Figure 2F:
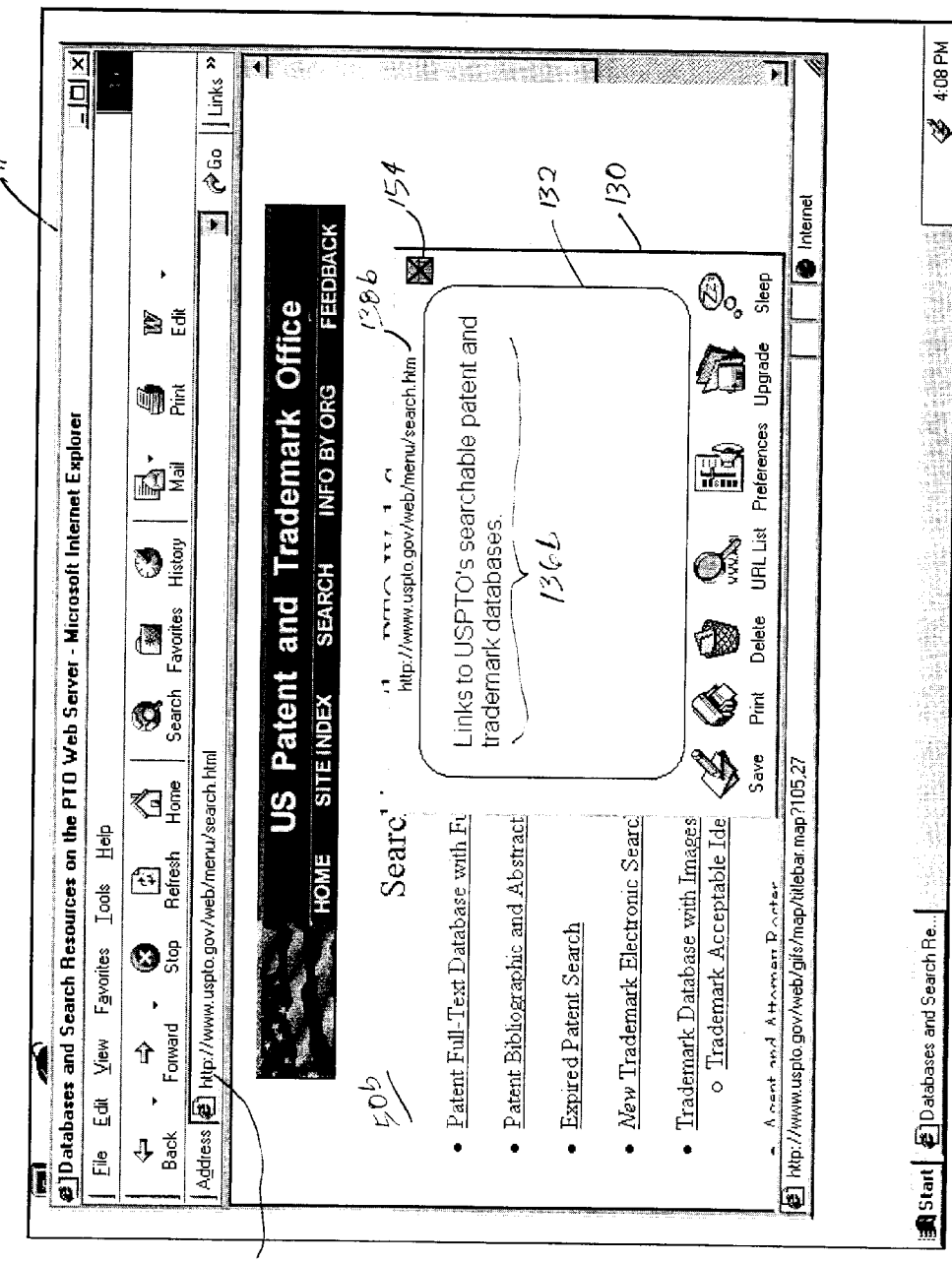
Figure 26:
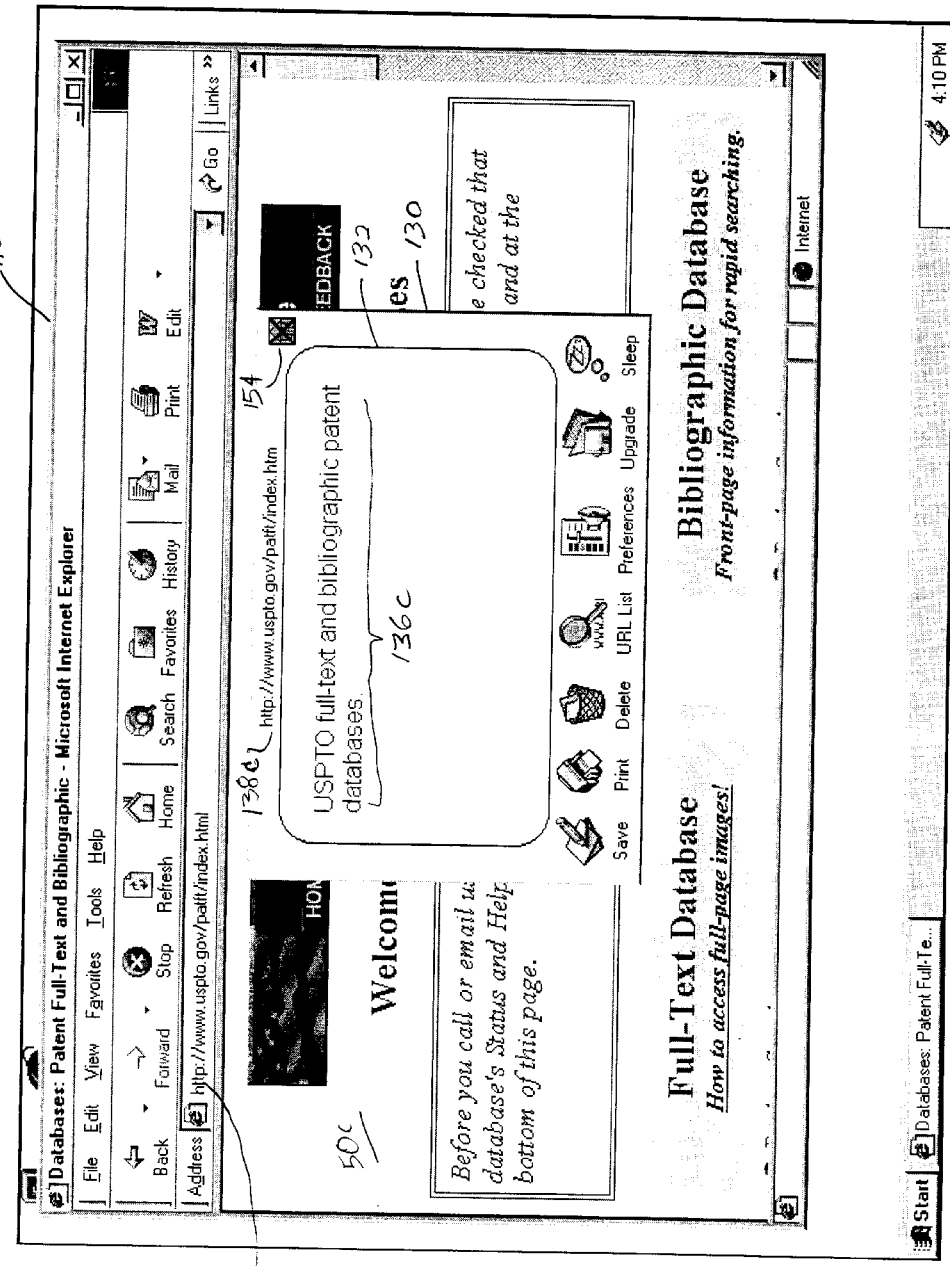

FIG. 2F shows the screen display 100 with Web browser 60 navigated to the Web page 50b having the URL http://www.uspto.gov/web/menu/search.html (a sub-page of the United States Patent Trademark Office's Web site). The application window 130 has been opened (e.g., by double-clicking on the application icon 120), and note data 136b entered by the user is displayed in the note display area 132 of the application window 130. The note data 136b may be saved to an appropriately named note file 80b (e.g., httpwwwusptogovwebmenusearchhtml.rtf) by clicking on the save button 134a, by clicking on the sleep button 134g, or by navigating to a new Web page. Since, as indicated by the first small icon 154, the client-side application program 20 is in the un-stick-to-home mode, when the note data 136b is saved to note file 80b, the entry made in the index database 90 cross-references the name of note file 80b with the URL 138b of the displayed Web page 50b.

FIG. 2G shows the screen display 100 with Web browser 60 navigated to the Web page 50c having the URL http://www.uspto.gov/patft/index.html (another subpage of the United States Patent Trademark Office's Web site). The application window 130 has been opened and note data 136c entered by the user is displayed in the note display area 132 of the application window 130. The note data 136c may be saved to an appropriately named note file 80c (e.g., httpwwwusptogovpatftiindexhtml.rtf) by clicking on the save button 134a, by clicking on the sleep button 134g, or by navigating to a new Web page. When the note data 136c is saved to note file 80c, the entry made in the index database 90 cross-references the name of note file 80c with the URL 138c of the displayed Web page 50c.

Figure 2H:
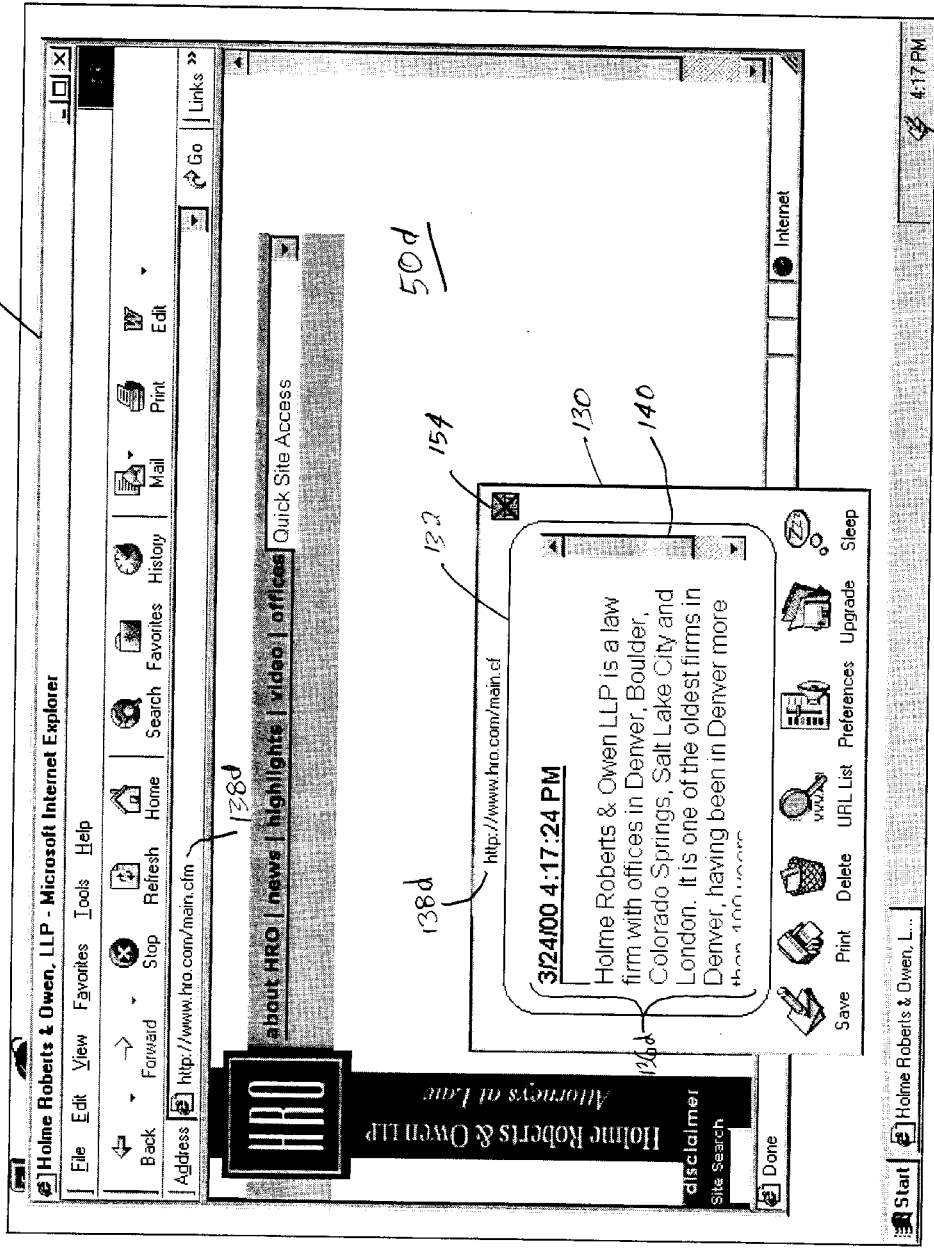

FIG. 2H shows the screen display 100 with Web browser 60 navigated to the Web page 50d having the URL http:// www.hro.com/main.cfm (a sub-page of Holme Roberts & Owen LLP's Web site). The application window 130 is open and note data 136d entered by the user is displayed in the note display area 132 of the application window 130. Since more screen area is required to display all of the note data 136d than is available in the note display area 132, a scroll bar 140 is provided that permits the user to scroll the note data 136d displayed within the note display area 132. The user may also resize the application window 130 in the standard manner in order to increase the screen area of the note display area 132. When the user clicks on the save button 134a, clicks on the sleep button 134g, or by navigates to a new Web page, the note data 136d is saved to an appropriately named note file 80d (e.g., httpwwwhrocommaincfm.rtf). When the note data 136d is saved to note file 80d, the entry added to the index database 90 cross-references the name of note file 80d with the URL 138d of the displayed Web page 50d.

Figure 2I:
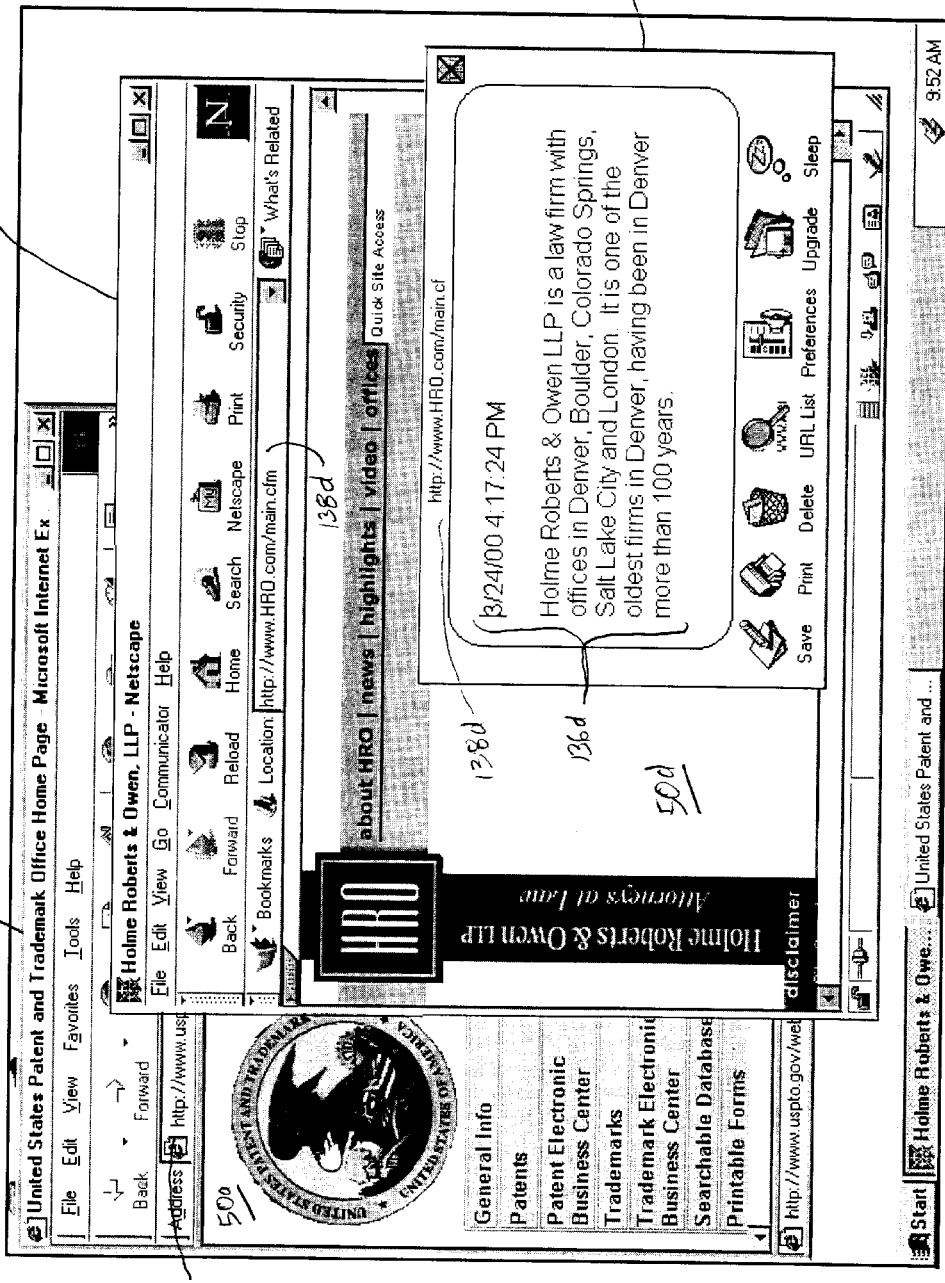

Referring now to FIGS. 2I and 2J, the application program 20 can monitor two or more Web browsers simultaneously operating on the client device 30 and use a system timer and application programming interface calls to make periodic determination as to which browser is in-focus and what URL it is pointing to. Application program 20 then presents a note file corresponding with the URL of the Web page pointed to by the browser determined to be in-focus. As illustrated in the screen display 100 shown in FIG. 2I, there may be a first web browser window 110 associated with a first web browser 60 that is operating on client device 30 and a second Web browser window 110' associated with a second Web browser 60' that is also operating on the client device 30. The first Web browser 60 is being used to access and display Web page 50a and the second Web browser 60' is being used to access and display Web page 50d. Because the second Web browser 60' is selected to be in focus, (as indicated by the depressed button graphic used for its association icon in the taskbar), the application program 20 displays note file 80d corresponding with Web page 50d in the note display area 132 of the application window 130. If, as is shown in FIG. 2J, the first Web browser 60 is selected to be in-focus, the application program 20 recognizes the change in which browser 60, 60' is selected as in-focus and automatically displays note file 80a corresponding with Web page 50a in the note display area 132 of the application window 130.

Figure 2K:
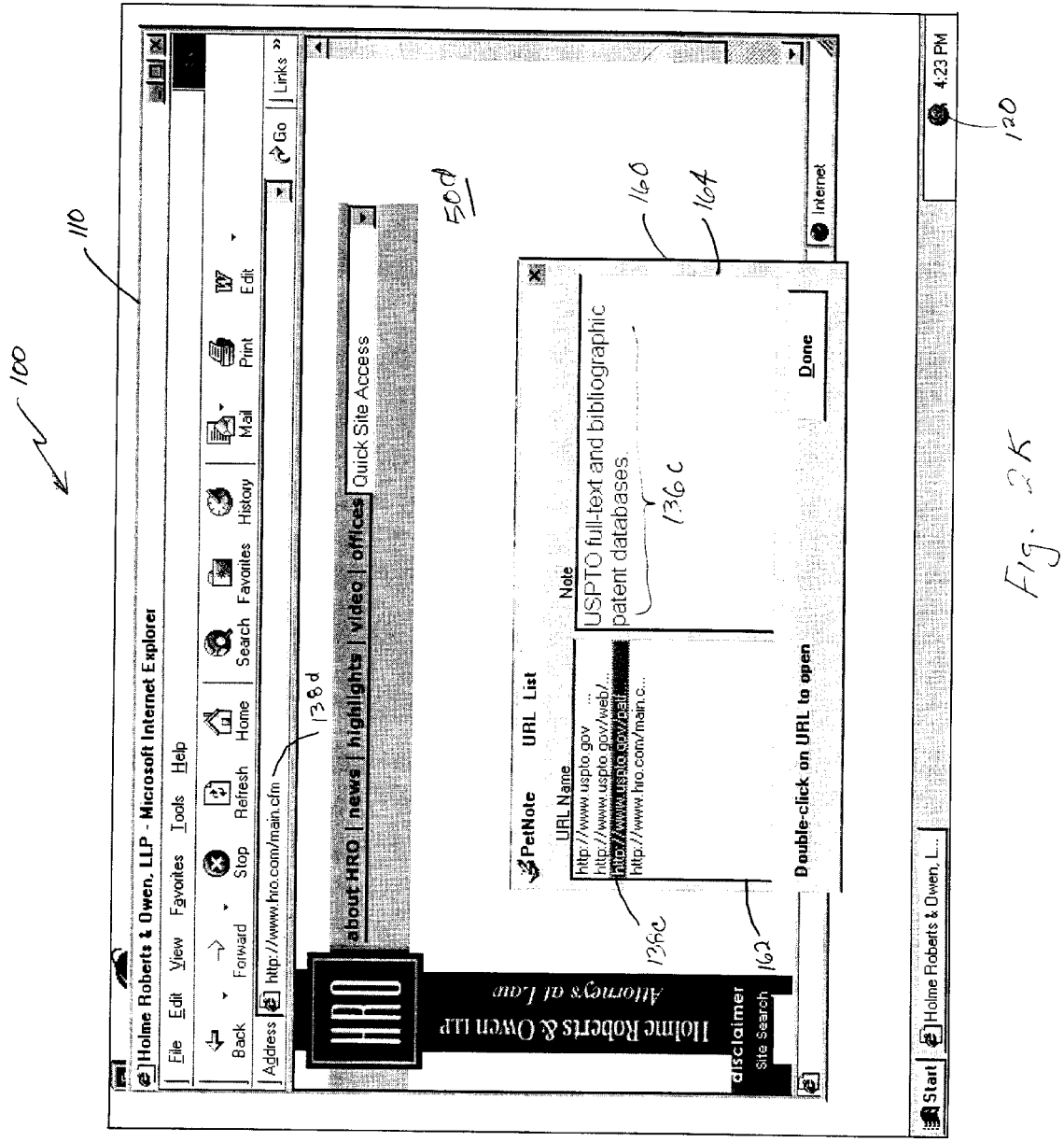

Referring now to FIG. 2K, when the user clicks on the URL list button 134d or right-clicks on the application icon 124 and selects the browse URL list command 124b from the pop-up menu 122 (shown in FIG. 2A), the application window 130 is closed (as indicated by the graphic used for application icon 120) and a URL list window 160 is opened in the foreground. The URL list window 160 includes a URL list area 162 and a note display area 164. The URLs 138a–d identifying Web pages 50a–d and for which associated note files 80a–d have been saved are listed in the URL list area 162 of the URL list window 160. By clicking on one of the URLs 138a–d in the URL list area 162, the user can display the note data 136a–d of the note files 80a–d associated with the Web pages 50a–d having the listed URLs 138a–d. By way of example, by clicking on URL 138c, note data 136c of note file 80c is shown in the note display area 164 of the URL list window 160 as is illustrated. Thus, the URL list window 160 provides for review of the contents of the various note files 80a–d.

In addition to providing for review of the contents of the note files 80a–d, the URL list window 160 also provides for easy navigation to one of the Web pages 50a–d for which associated note files 80a–d have been saved. By way of example, if the user wishes to visit Web page 50c, the user simply double-clicks on URL 138c in the URL list area 162 of the URL list window 160. The URL list window 160 is then closed, the Web browser 60 is directed to access and display Web page 50c, and the application window 130 is opened with the note data 136c of note file 80c displayed in the note display area 132 of the application window 130, such as is shown in FIG. 2G.

Referring now to FIG. 3, an example of the entries made in the index database 90 is shown. In this regard, the index database 90 may, for example, be an ASCII text file wherein each entry 92 includes the name of a note file paired with the URL of its associated Web page. By way of example, after each of the note files 80a–d have been saved, the index database 90 has four entries: the name of note file 80a paired with URL 138a, the name of note file 80b paired with URL 138b, the name of note file 80c paired with URL 138c, and the name of note file 80d paired with URL 138d. Each entry 92 in the index database 90 may be separated from the following and previous entries 92 by separator character strings 94.

Whenever the Web browser 60 is navigated to a Web page, the client-side application program 20 compares the URL of the accessed Web page with the URLs 138a–d included in the entries 92 in the index database 90. If a match is found, the application window 130 is opened and the note data 136a–d of the associated note file 80a–d is automatically displayed. If the user does not want note data 136a–d of the note files 80a–d to be automatically displayed when the Web browser 60 accesses one of the associated Web pages 50a–d, the user may right click on the application icon 120 and select the de-activate-auto-pop-up command 124c from the pop-up menu 122 (shown in FIG. 2A). If no matching entry is found in the index database 90, the application window 130 remains closed until the user double-clicks on the application icon 120 or selects the new note command 124a from the pop-up menu 122. It should be appreciated that in other embodiments, the application window 130 may be opened ready for the input of note data for a new note whenever the Web browser 60 accesses a Web page for which no matching entry is found in the index database 90 without the need for double-clicking on the application icon 120 or other like action on the part of the user.

Figure 4A:
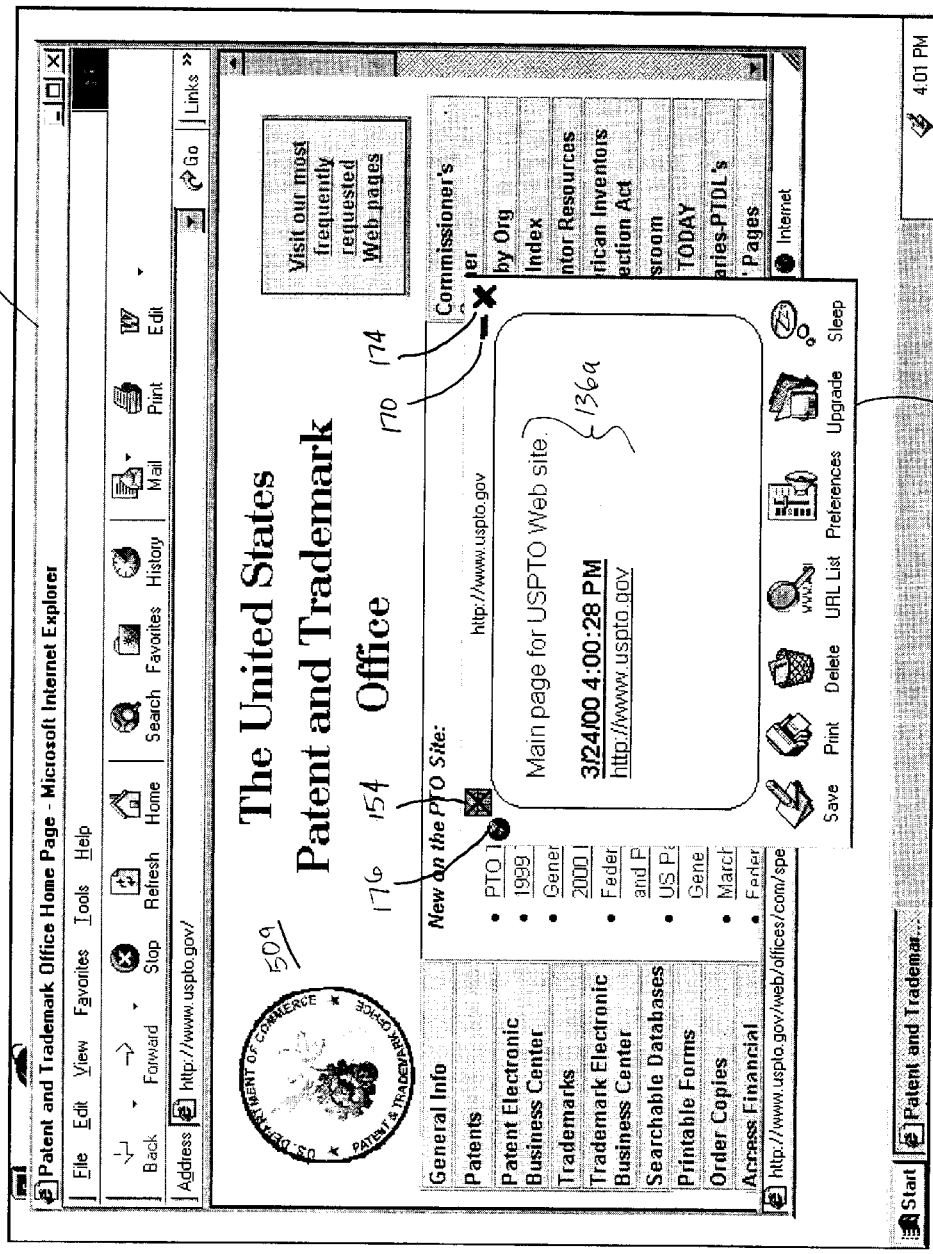
Figure 4B:
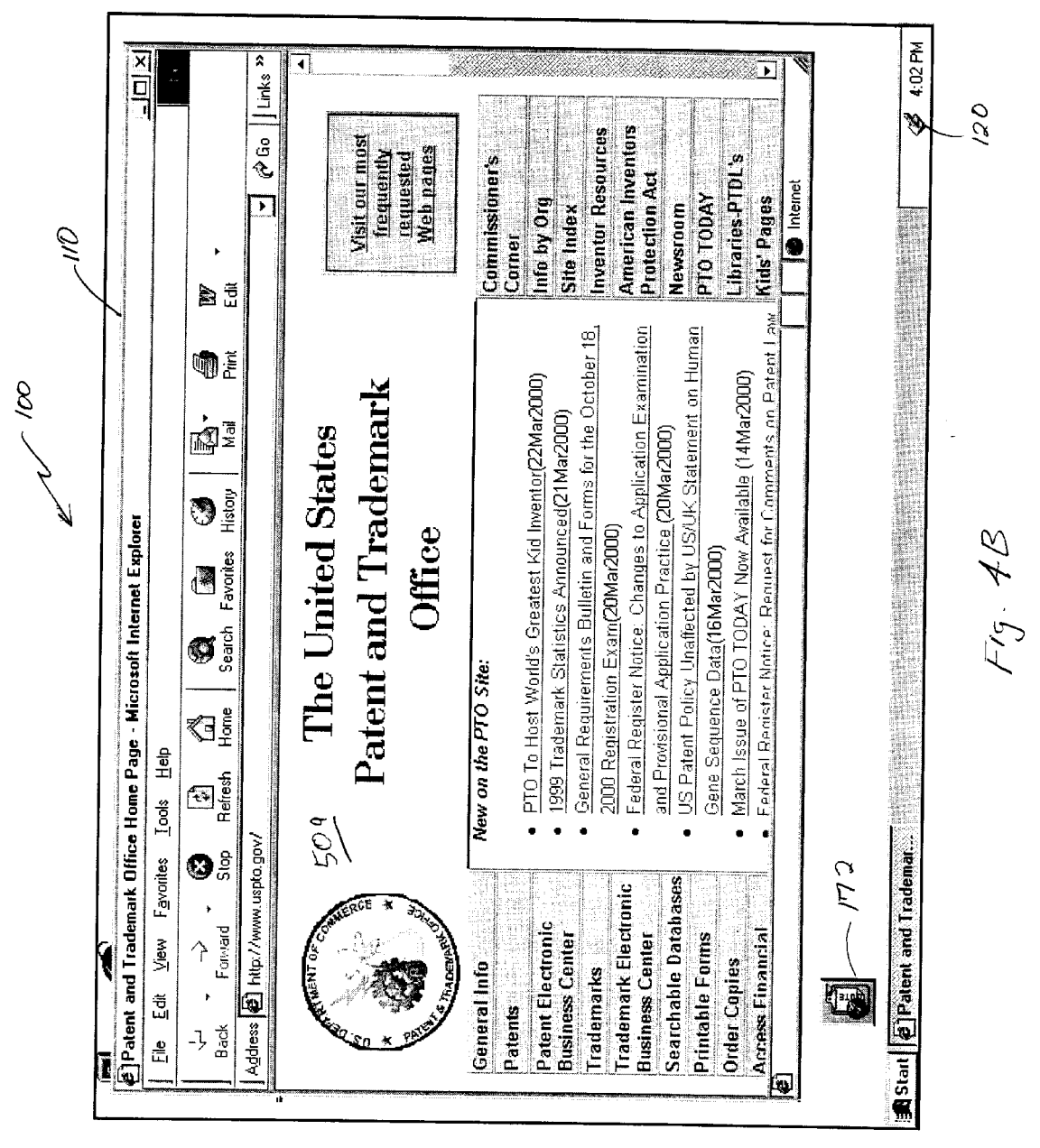

Referring now to FIGS. 4A and 4B, the application program 20 may also include a feature which permits selective minimization of the application window 130 in order to facilitate viewing of the Web page 50a displayed in the Web browser window 110 without interference from the application window 130. A minimization button 170 may be provided in the application window 130 that, when clicked on, causes the application window 130 to be reduced to a minimized application window icon 172 such as shown in FIG. 4B. The minimized application window icon 172 may be positioned on the desktop where desired. When the user wants to see the note files, the minimized application window icon 172 may be enlarged to the application window 130 by, for example, double-clicking on the minimized application window icon 172. In addition to the minimization button 170, the application window 130 may also include an application closing button 174. When the application closing button 174 is clicked on, the application program 20 is closed.

Referring again to FIG. 4A, the application program 20 may include a freeze URL feature which, when turned on, associates all new notes created while the freeze URL feature is on with the URL of the Web page 50a accessed when the freeze URL feature is turned on. The freeze URL feature allows the user to create note files that are all associated with a single Web page while viewing other Web pages. The freeze URL feature may be turned off when the user wishes to resume normal operation of the application program 20. The freeze URL feature may, for example, be alternatively turned on and off by clicking on a second small icon 176 provided in the application window 130. The graphic used for the second small icon 176 may indicate whether the freeze URL feature is on or off. For example, a globe graphic such as shown is FIG. 4A may be used as the second small icon 176 to indicate that the freeze URL feature is off, and when it is on, a stop sign graphic (not shown) may be used to indicate that the freeze URL feature is on.

While various embodiments of the present invention have been described in detail, it is apparent that further modifications and adaptations of the present invention will occur to those skilled in the art. However, it is to be expressly understood that such modifications and adaptations are within the spirit and scope of the present invention.

What is claimed is:

1. A method for associating annotations with a plurality of information resources on a client device, used in connection with browsing of information resources accessible to the client device through a data network, said method comprising:

(a) monitoring a browser on the client device to determine the current uniform resource locator address pointed to by said browser; and (b) determining whether there is a stored note file corresponding with the address determined in said monitoring step; and (c) outputting at least some data from the stored note file corresponding with determined uniform resource locator, determined in said monitoring step, wherein execution of said outputting step is based on a determination made in said determining step that there is a stored note file corresponding with the uniform resource locator address determined in said monitoring step, wherein no modification or alteration is made to the information resource being displayed by the browser, thereby maintaining the physical and visual integrity of the information resource; and wherein the efficiency of the transfer of the information resource over the data network is unaffected, and persistent connection to a data network is not required; and wherein successful execution of said method is not contingent upon the integrity of the information resource being annotated or the outcome or quality of the transfer of the information resource over the data network.

2. The method of claim 1 wherein the stored note file corresponding with the accessed information resource is stored on a data storage device of the client device.

3. The method of claim 1 wherein in said step of outputting, at least some data from the stored note file corresponding with the accessed information resource is output on a display screen accessible to the client device.

4. The method of claim 1 wherein in said step of outputting, at least some data from the stored note file corresponding with the accessed information resource is output audio speaker accessible to the client device.

5. The method of claim 1 wherein in said step of outputting, at least some data from the stored note file corresponding with the accessed information resource is output on a printer accessible to the client device.

6. The method of claim 1 wherein in said step of determining, accessed information resource comprises a Web page accessible to the client device through the internet.

7. The method of claim 1 further comprising:

Receiving data inputable by a user of the client device for inclusion in a new note file corresponding to the uniform resource locator of the accessed information resource, wherein said receiving step is executed based on a determination made in said determining step that there is no stored note file corresponding with the accessed information resource.

8. The method in claim 1 wherein accessed information resource resides wholly or partially on the client device.

9. The method in claim 1 wherein the client device is disconnected from any data network.

10. The method in claim 1 wherein multiple browsers are executed on the client device simultaneously, wherein a single note is displayed which corresponds with 1the uniform resource locator address of the browser which is considered to be "in focus" by the operating system on the client device.

11. The method in claim 10 wherein the user of the client device can toggle among multiple browsers and be presented with the proper note corresponding to the uniform resource locator pointed to by the individual browser which is determined to be "in focus" by the operating system at that time.

12. The method in claim 1 wherein the note content is saved in format allowing the note to contain graphics and sound information objects, including but not limited to the user's ability to drag, drop and otherwise embed these objects from the documents being annotated, in the note.

13. The method in claim 1 wherein said steps determining whether there is a note corresponding to the uniform resource locator pointed to by the browser, and displaying at least a portion of the note, are triggered automatically when the uniform resource locator pointed to by the browser changes.

14. The method in claim 1 wherein said step of monitoring the browser is accomplished by periodically determining the uniform resource locator of the browser by using at least one system timer and application programming interface.

15. The method in claim 1 wherein the notes are stored in rich text format, incorporating all multimedia objects therein, in a file structure and are correlated to the uniform resource locator with which they each correspond.

16. The method in claim 1 wherein a note can be transported from a source client device to one or more target devices, and integrate with the note system in each target client device so as to exhibit the behavior of the note on the source client device on the target devices.

17. The method in claim 1 wherein the transportation of a note from a client device to a target device is accomplished via email.

18. The method in claim 1 further comprising a password/profile-based security system wherein all notes are stored and displayed on the client device in the context of an individual user on that device, wherein a different user on the client device is unable to see the notes associated with a specific uniform resource locator saved by another user on that client device.

19. A system for creating and using electronic annotations relating to information resources, said system comprising:

at least one processor enabled for accessing information resources through a browser;

at least one storage device accessible by said at least one processor;

at least one output device accessible by said at least one processor;

at least one input device accessible by said at least one processor;

an operating system which allows for the use of a timer functionality and an application programming interface;

at least one browser application program executable by said at least one processor;

an application program executable by said at least one processor, wherein said application program enables said at least one processor to:

utilize said timer and said application programming interface functionality to make high frequency determination of which of the individual browser applications, executing on said at least one processor and displayed on said output device, is in-focus;

utilize said timer and said application programming interface functionality to make high frequency determinations of the uniform resource locator address pointed to by said in-focus browser;

determine whether a previously created note file corresponding with the determined uniform resource locator address, is stored on the client device;

output, based on determination made in said determining step that there is a note file corresponding with the uniform resource locator address on the client device, at least some data from the previously created note file on an output device of the client device; and receive, based on a determination made in said determining step that there is no note file corresponding with the uniform resource locator address stored on the client device, data inputable by a user of the client device for inclusion in a new note file corresponding to the uniform resource locator address.

* * * * *